US005653336A

United States Patent [19]
Buonaiuto et al.

[11] Patent Number: 5,653,336
[45] Date of Patent: Aug. 5, 1997

[54] CELLULAR PHONE CARRYING DEVICE

[76] Inventors: Erik Buonaiuto, 10764 Penara St., San Diego, Calif. 92126; Val Buonaiuto, 3356 Newton Dr., Mountain View, Calif. 94040

[21] Appl. No.: 627,780

[22] Filed: Apr. 1, 1996

[51] Int. Cl.$^6$ ................................................. A45C 11/00
[52] U.S. Cl. ......................... 206/320; 206/37; 206/806; 224/222; 224/673; 224/930
[58] Field of Search ............................... 224/929, 930, 224/222, 250, 673, 676, 677; D3/218; 206/305, 320, 38, 37, 806

[56] References Cited

U.S. PATENT DOCUMENTS

| D. 293,857 | 1/1988 | Stout et al. | 224/250 X |
|---|---|---|---|
| 1,382,446 | 6/1921 | Warren | 224/222 X |
| 3,482,748 | 12/1969 | Roberts, Jr. | 224/930 X |
| 3,797,715 | 3/1974 | Scialdone | 224/2 B |
| 3,813,017 | 5/1974 | Pimsleur | 224/26 R |
| 3,884,403 | 5/1975 | Brewer | 224/5 V |
| 3,977,582 | 8/1976 | McMahon | 224/1 R |
| 4,119,249 | 10/1978 | Hanson | 224/682 X |
| 4,128,194 | 12/1978 | Hinz | 224/5 R |
| 4,420,104 | 12/1983 | DiIenno | 224/250 |
| 4,764,962 | 8/1988 | Ekman et al. | 381/24 |
| 4,771,927 | 9/1988 | Ventura | 224/252 |
| 4,903,874 | 2/1990 | Shoemaker | 224/206 |
| 4,966,321 | 10/1990 | Outlaw | 224/253 |
| 5,174,483 | 12/1992 | Moore, IV et al. | 224/250 |
| 5,263,618 | 11/1993 | Talavera | 224/148 |
| 5,358,159 | 10/1994 | Lundie, Jr. | 224/930 X |
| 5,526,924 | 6/1996 | Klutznick | 224/250 X |

OTHER PUBLICATIONS

"For Counsel" Products and Gifts for Lawyers, Summer–Fall Catalog, Vo. 13b p. 15 (1996).

*Primary Examiner*—Jacob K. Ackun
*Attorney, Agent, or Firm*—Suzanne F. Seavello; Hopkins & Carley

[57] ABSTRACT

A device for carrying a cellular phone on the torso includes a receptacle for holding the phone. In one embodiment, a side strap assembly attaches to a pair of suspenders while supporting the receptacle. The position of the receptacle is moveable along the side strap assembly from the upper chest to the side or back of the wearer. In another embodiment, a shoulder strap assembly supports the receptacle under the arm of a wearer. The elements of the device are visible and not meant to be concealed as are a gun, money, checkbook, credit card or other type of carrying cases. The receptacle is formed from a flexible material. The back of the receptacle includes two vertically spaced horizontal slots and an optional loop for easily mounting the receptacle to a pair of suspenders and the optional strap assemblies. The back of the receptacle also includes a mechanism for removably securing the receptacle to the suspenders and strap assemblies. The sides of the receptacle are adjustable to accommodate cellular phones of various widths. In an alternative embodiment, the receptacle has a cover to help secure the phone inside the receptacle. The shoulder and side strap assemblies are coordinated with the color and design of suspenders for a fashionable appearance. The strap assemblies for the device are adjustable according to body size and shape of the wearer.

17 Claims, 3 Drawing Sheets

CELLULAR PHONE CARRYING DEVICE

BACKGROUND OF THE INVENTION

1. Field of the Invention

This invention relates generally to carrying devices, and more particularly to a phone holder adapted to retain a cellular telephone onto a pair of suspenders or strap assemblies of the invention.

2. Previous Art

Individuals use cellular phones in a variety of places, for example, in cars, homes, and yards, at the office, while out golfing, shopping, or sightseeing, or while attending sporting events and while at restaurants. At each of these places, individuals are already carrying several items, or want to have their hands free. Therefore, cellular phones are not convenient to carry and as a result are frequently not readily available when needed.

Some users place cellular phones in a jacket pocket, but often the jacket is left in another room, at the office, or in the car. When the user desires to make a call, he or she discovers that the phone is not nearby. Cellular phones are put in purses, but often purses are left in another room, at the office, or in the back seat of a car. Occasionally, a purse may be too small to carry a phone. A user may place a cellular phone in his or her pants pockets, but this makes sitting uncomfortable. Therefore, an individual will take the phone out of the pants pocket and set it on a table. Then the phone is forgotten and the owner must go back to the restaurant, office or other room to retrieve it.

Hip devices which attach to a belt for carrying cellular phones are known. However, these also make sitting uncomfortable and are not fashionable.

A variety of devices are disclosed in the prior art directed to carrying articles about the torso of a user. U.S. Pat. Nos. 3,797,715; 4,903,874 and 4,966,321 all relate to specially adapted, heavy weight holsters and harnesses for guns and power tools. These devices are not suitable for business persons, because they are cumbersome and uncomfortable. Persons of all types also prefer a more fashionable phone carrying device when meeting with clients and customers and while seated in the car or while traveling.

U.S. Pat. No. 3,884,403 relates to a camera carrying strap worn over the shoulders and chest for fast accessibility. U.S. Pat. No. 4,764,962 relates to strapping stereo speakers on the shoulders near the ears and a pouch for supporting a portable stereo on the chest. These devices are also not suitable for business persons because of the awkward positions of the holder.

Only two devices are known to applicant that are intended for carrying a cellular phone. U.S. Pat. No. Des. 284,372 to Carpenter, apparently having non-transparent continuous sheet material forming the walls thereof in a novel configuration. U.S. Pat. No. 4,771,927 provides a phone holder for retaining a cellular phone to a user's waistband.

What is needed is a cellular phone carrying device which is comfortable and convenient to wear for keeping the phone readily available.

What is needed is a cellular phone carrying device which makes seating more comfortable when carrying a cellular phone.

What is needed is a cellular phone carrying device which provides a more practical method of carrying a cellular phone than is presently available.

What is also needed is a device which provides easy access to the cellular phone.

What is also needed is a device which is fashionable.

What is also needed is a device which is easily adaptable to several forms of attire.

SUMMARY OF THE INVENTION

The present invention substantially reduces or overcomes all of the above problems associated with the prior art. The invention is a device for carrying a cellular phone on the torso. The invention includes a receptacle for holding the phone. In one embodiment, a side strap assembly attaches to a pair of suspenders while supporting the receptacle. The position of the receptacle is moveable along the side strap assembly from the upper chest to the side or back of the wearer. In another embodiment, a shoulder strap assembly supports the receptacle under the arm of the wearer. The elements of the device are visible and not meant to be concealed as are a gun, money, checkbook, credit card or other type of carrying cases.

The receptacle is formed from a flexible material, such as plastic, vinyl, cloth, suede, leather, or an elastic type of material. The back of the receptacle includes two vertically spaced horizontal slots and an optional loop for easily mounting the receptacle to a pair of suspenders and the optional strap assemblies. The back of the receptacle also includes a mechanism for removably securing the receptacle to the suspenders and strap assemblies. The sides of the receptacle are adjustable to accommodate cellular phones of various widths. In an alternative embodiment, the receptacle has a cover to help secure the phone inside the receptacle.

The shoulder and side strap assemblies are coordinated with the color and design of suspenders for a fashionable appearance. The strap assemblies for the device are adjustable according to body size and shape of the wearer.

Accordingly, it is an object of the present invention to provide a cellular phone carrying device that is comfortable and convenient to wear.

It is also an object of the present invention to provide a cellular phone carrying device that is fashionable and practical for all persons.

It is also an object of the present invention to provide a cellular phone carrying device that is easily adaptable to several forms of attire by adjustable straps and the ability to place the receptacle in several positions.

Other objects and further scope of applicability of the present invention will become apparent from the detailed description given below. It should be understood, however, that this detailed description, while indicating preferred embodiments of the invention, is given by way of illustration only, since various changes and modifications within the spirit and scope of the invention will become apparent to those skilled in the art.

In accordance with the above objects and those that will be mentioned and will become apparent below, a cellular phone carrying device comprises:

- a receptacle corresponding in size to the cellular phone for holding same, the receptacle being formed from a flexible material, the receptacle having a front panel, a back panel, two inner side panels, two outer side panels and a bottom panel;
- the front panel, the back panel, the two inner side panels and the two outer side panels having upper edges defining a top opening for receiving the cellular phone into the receptacle;
- the back panel having two vertically spaced horizontal slots for receiving a vertical strap for supporting the receptacle; and the back panel having a first means for removably and adjustably securing the receptacle in a desired position on the vertical strap supporting the receptacle.

In a preferred embodiment, the sides of the receptacle are adjustable to accommodate the widths of various cellular phones.

In another preferred embodiment the receptacle further includes a top cover panel formed from another piece of the flexible material, the top cover panel being of a size of the top opening, the top cover panel extending from the back panel for folding over and covering the top opening.

In another preferred embodiment the back panel has a loop formed from the flexible material, the loop being placed above the two vertically spaced horizontal slots for receiving a horizontal strap for supporting the receptacle.

In an additional preferred embodiment the device further includes a side strap assembly for attaching to a pair of suspenders such that the phone receptacle is supported on the side strap assembly and the receptacle may be moved from the chest area to the side.

In another embodiment, the device includes a shoulder strap assembly for supporting the receptacle under the arm of the wearer.

It is an advantage of this invention to provide a device that is comfortable and convenient to wear by both men and women for keeping a cellular phone readily available.

It is an additional advantage of this invention to provide a device that is easily adjustable to several outfits and for wearing the phone in several positions.

It is an additional advantage of this invention to provide a device that is fashionable and meant to be seen.

BRIEF DESCRIPTION OF THE DRAWING

For a further understanding of the objects and advantages of the present invention, reference should be had to the following detailed description, taken in conjunction with the accompanying drawing, in which like parts are given like reference numerals and wherein.

DETAILED DESCRIPTION OF THE INVENTION

Figure 1:
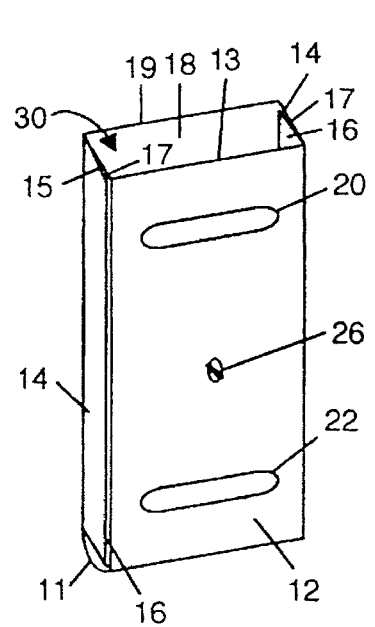
FIG. 1 is a perspective rear view of the receptacle of the device.

FIG. 1 is a pictorial diagram of a rear view of the receptacle of the invention, denoted generally by the numeral 10. The receptacle 10 includes a back panel 12, two outer side panels 14, two inner side panels 16, front panel 18, two vertically spaced horizontal slots 20, 22, fastener 26, and a bottom panel 11. The upper edges 13, 15, 17, 19 of the back panel 12, side panels 14, 16 and front panel 18 define a top opening 30 for receiving the cellular phone.

Figure 2:
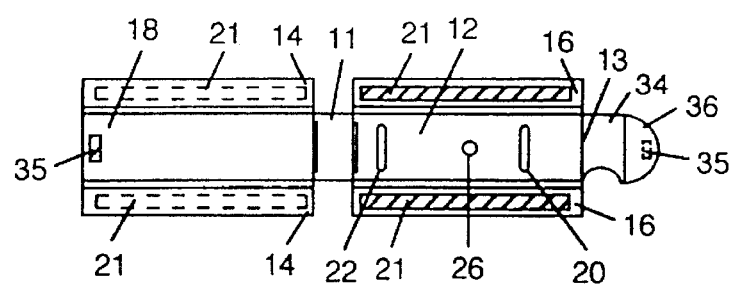
FIG. 2 is a plan view of a unitary piece of flexible material from which one embodiment of the receptacle of FIG. 1 is formed.

FIG. 2 illustrates the relationships between each panel and the manner in which one embodiment of the receptacle 10 is manufactured. Shown face up is the outer surface of the panels of the receptacle 10. Various parts in FIG. 2 are illustrated in FIG. 1 and it may be seen that the front panel 18, back panel 12, side panels 14, 16 and bottom panel 11 are formed contiguously from a unitary piece of flexible material. Additionally, in the embodiment of FIG. 2, a top cover panel 34 and a flap 36 for the top opening 30 of the receptacle 10 are included in the unitary piece of material.

Although FIG. 2 illustrates an embodiment of the receptacle 10 of the present invention being formed contiguously from a unitary piece of flexible material, alternative embodiments are formed from separate pieces. Forming the receptacle 10 from separate pieces of flexible material ensures that a fashion design on the receptacle 10 is kept in proper orientation.

The flat piece illustrated in FIG. 2 is assembled into the receptacle 10 illustrated in FIG. 1 by folding at the junctions between the bottom panel 11 and the front panel 18 and back panel 12. When the flat piece is folded in this manner, outer side panels 14 extend from the front panel 18 toward back panel 12 and inner side panels 16 extend from the back panel 12 toward front panel 18. Outer side panels 14 are then folded over and secured to inner side panels 16.

The inner surfaces of outer side panels 14 and the outer surfaces of inner side panels 16 have a material 21 for resealably and adjustably securing the inner surface of outer side panels 14 to the outer surface of inner side panels 16. This material is contact sensitive and securely fastens the sides of the receptacle regardless of the width and height of the cellular phone. In one embodiment, the inner surfaces of outer side panels 14 and the outer surfaces of inner side panels 16 have mating hook and pile material, such as Velcro™.

The resealably and adjustably securing material 21 of the side panels 14, 16 allows for accommodating cellular phones with thicknesses varying from one inch to two inches. Preferably, the receptacle accommodates cellular phones having widths within the range of 1¼ to 1¾ inches.

The top cover panel 34 extends from the upper edge 13 of the back panel 12. The top cover panel 34 has a flap 36 for extending downwardly upon the front panel 18 of the completed receptacle 10.

The inside surface of the flap 36 and the outer surface of front panel 18 have a second material 35 for resealably and adjustably securing the flap 36 to the front panel 18. In one embodiment, the inner surface of the flap 36 and the outer surface of front panel 18 have mating hook and pile material, such as Velcro™. In another embodiment, the flap 36 is secured to the front panel 18 with snaps. In another embodiment, the flap 36 is secured to the front panel 18 with buttons. In another embodiment, the flap 36 is secured to the front panel 18 with clips. In another embodiment, the flap 36 is secured to the front panel 18 with pins.

The receptacle 10 is formed from a flexible material. In one preferred embodiment, the flexible material is cloth. In another preferred embodiment, the material is elastic. In another preferred embodiment, the material is the type of material used for making suspenders. In another embodiment, the material is leather. In another embodiment, the material is suede. In another embodiment, the material is a type of plastic.

In one embodiment, the outer width of the front panel 18 and back panel 12 of the receptacle 10 is approximately 2½ inches and the height of the receptacle 10 is approximately 5½ inches. The length of the slots is approximately 1½ inches.

Figure 3:
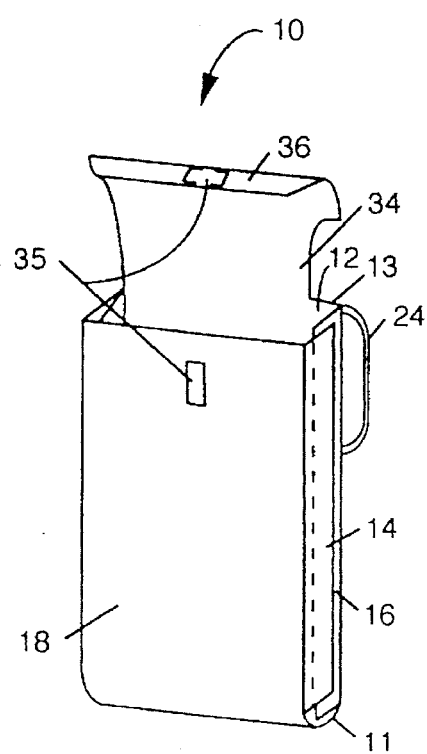
FIG. 3 is a perspective front view of a second embodiment of the receptacle of FIG. 1 showing a cover and a loop.

FIG. 3 is a front view of receptacle 10 showing the top cover panel 34, the flap 36 and the loop 24. The loop 24 is attached to the back panel 12, between the upper edge 13 and the uppermost slot 20. The loop 24 is formed from the same flexible material as the receptacle 10.

Figure 4:
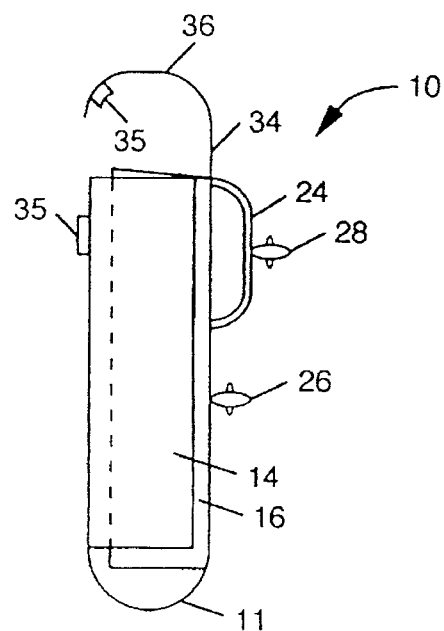
FIG. 4 is a side view of the receptacle of FIG. 3 having a cover and loop.

FIG. 4 is a side view of the receptacle 10, illustrating the loop 24, cover panel 34, flap 36, fastener 26 and second fastener 28. Fasteners 26, 28 are for securing the receptacle 10 to a strap supporting the receptacle 10. Fasteners 26, 28 are any type of standard fasteners in the clothing industry. In one embodiment, the fasteners are clips. In another embodiment, the fasteners are pins. In another embodiment, the fasteners are snaps. In another embodiment, the fasteners are buttons. In another embodiment, the fasteners is Velcro™.

Figure 5:
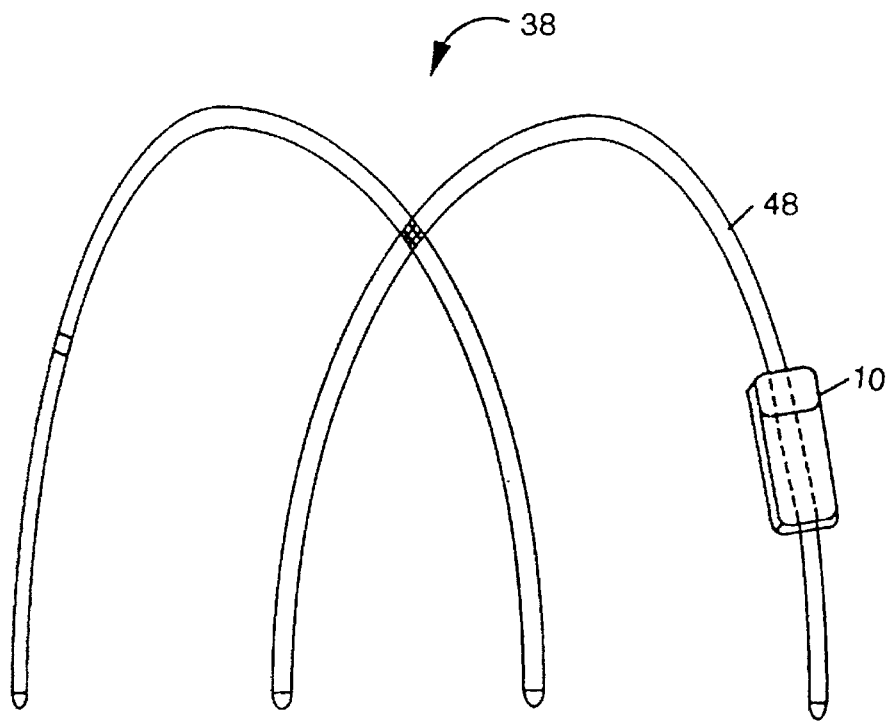
FIG. 5 is a pictorial diagram of a pair of suspenders supporting the receptacle of FIG. 1.

FIG. 5 is a pictorial diagram of a pair of suspenders supporting the receptacle 10 of the invention as shown in FIG. 1. The receptacle 10 is supported on a strap 48 of a pair of suspenders, denoted generally by the numeral 38. The strap 48 is slipped through the two vertical slots 20, 22. The receptacle 10 is moved to the preferred position on the suspender strap 48 and secured with fastener 26. In the alternative embodiment of the receptacle 10 shown in FIG. 3, the receptacle includes loop 24, and the position of receptacle 10 is also secured with the second fastener 28.

Figure 6:
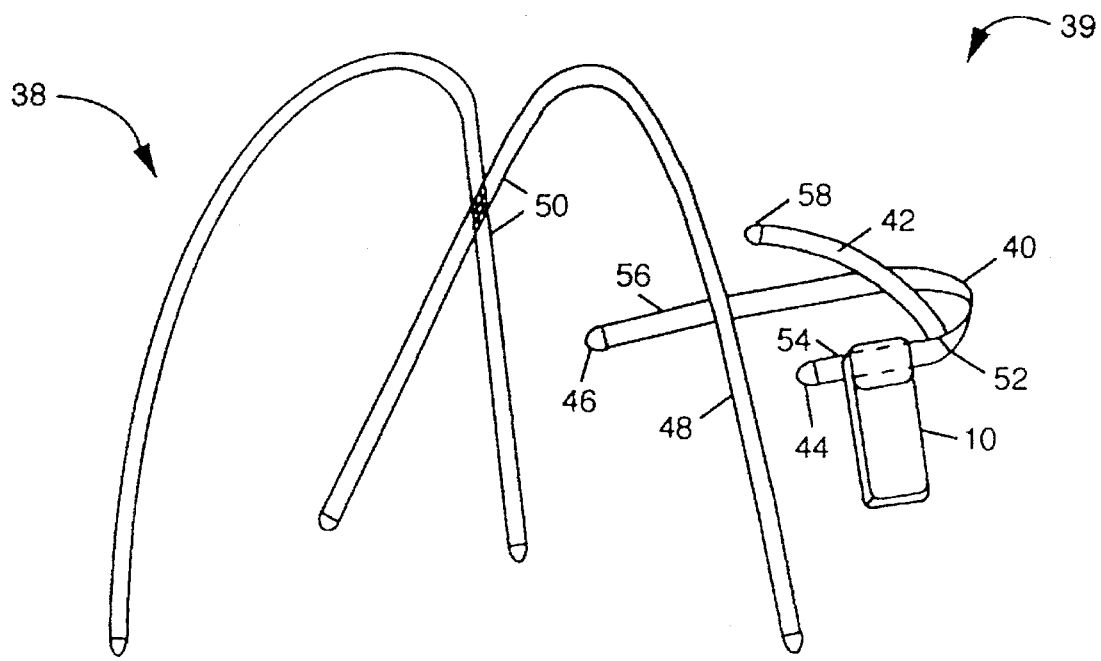
FIG. 6 is a pictorial diagram of the side strap assembly supporting the receptacle of FIG. 3.

FIG. 6 is a pictorial drawing of the side strap assembly of the invention, denoted generally by the numeral 39. The side strap assembly 39 attaches to a pair of suspenders 38. The side strap assembly 39 includes two straps, a horizontal strap 40 and a second strap 42 extending upwardly from the horizontal strap 40 and at an inclined angle toward the shoulder of the wearer. The second strap 42 provides additional support for the receptacle 10.

Both straps 40, 42 have adjustable lengths for fitting various sizes of wearers. Mechanisms employed for adjusting the length are standard in the clothing industry. In various embodiments, the mechanism is an S-shaped or 8-shaped metal or plastic adjustor.

The horizontal strap 40 has a front end 44 and a back end 46. The front end 44 is adapted to attach to the front strap 48 of the pair of suspenders 38, and the back end 46 is adapted to attach to the back strap 50 of the pair of suspenders 38. In one embodiment, the adaptations are clips. In another embodiment, the adaptations are pins. In another embodiment, the adaptations are snaps. In another embodiment, the adaptations are buttons. In another embodiment, the adaptation is Velcro™.

The point of attachment 52 of the second strap 42 to the horizontal strap 40 is closer to the front end 44 of the horizontal strap 40 than to the back end 46. The point of attachment 52 defines a short side 54 of horizontal strap 40, near the front end 44 of the horizontal strap 40 and a long side 56 of the horizontal strap 40 that wraps around the back of the wearer. The receptacle 10 is mounted on the short side 54 of the horizontal strap 40.

The second strap 42 also has a free end 58 for attaching to the pair of suspenders 38 near the shoulder of the wearer. In various embodiments, the attachment is made by a clip, a pin, a snap, a button, and Velcro™.

When the receptacle 10 is mounted on the horizontal strap 40 of the side strap assembly 39, the horizontal strap 40 is slipped through the loop 24 to the preferred resting position and fastened with the second fastener 28.

In an alternative embodiment of the invention, the side strap assembly is reversible for wearing the receptacle on both the right and the left sides of a person.

Figure 7:
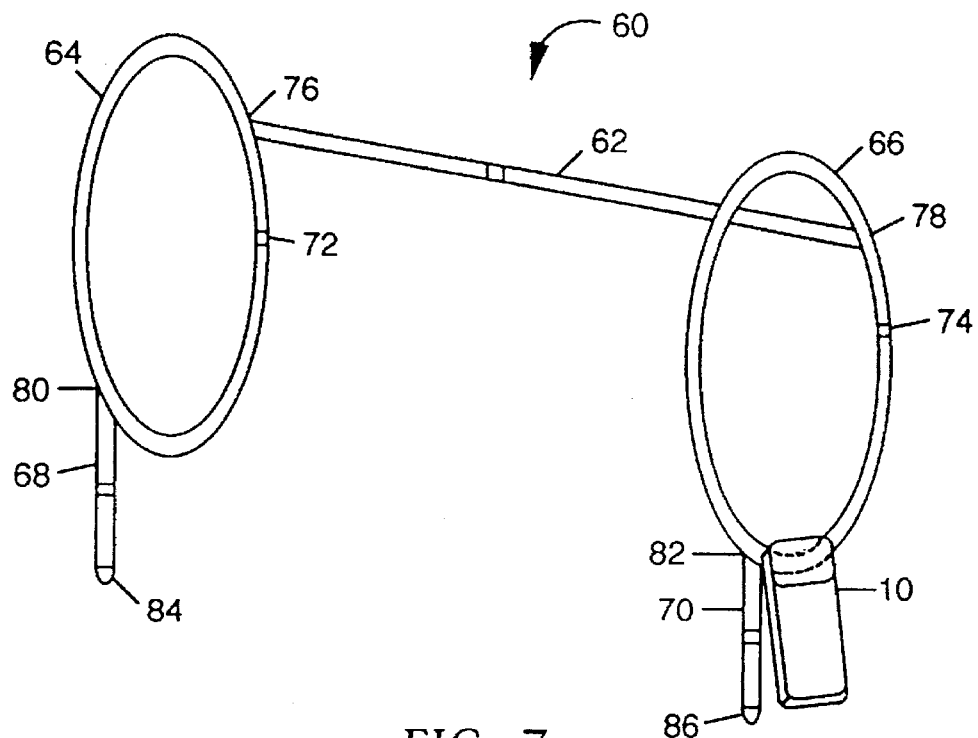
FIG. 7 is a pictorial diagram of the shoulder strap assembly supporting the receptacle of FIG. 3.

FIG. 7 is a pictorial diagram of the shoulder strap assembly of the present invention, denoted generally by the numeral 60. The shoulder strap assembly 60 includes a horizontal first strap 62, two straps that are to be formed into closed loops 64, 66, and two straps that hang downwardly 68, 70 from the loops 64, 66.

The straps 62, 64, 66, 68, 70 are formed from a flexible material. In one preferred embodiment, the flexible material is cloth. In another preferred embodiment, the material is elastic. In another preferred embodiment, the material is the type of material used for making suspenders. In another embodiment, the material is leather. In another embodiment, the material is suede.

The straps 62, 64, 66, 68, 70 have adjustable lengths for fitting various sizes of wearers. Mechanisms employed for adjusting the length are standard in the clothing industry, such as plastic or metal S-shaped or 8-shaped strap adjusters.

The first horizontal strap 62 has a right end 76 and a left end 78. The second strap 64 and third strap 66 are attached to the right end 76 and the left end 78 of the first strap 62, respectively. Each of the ends of the second strap 64 and third strap 66 are adapted to attach its own two ends together 72, 74 for forming a closed loop. The length of each of the second and third straps 64, 66 is also adjustable to fit around the shoulders and under the arms of people of varying sizes.

The fourth strap 68 and fifth strap 70 extend downwardly from the second and third straps 64, 66. In one embodiment, the points of attachment 80, 82 of the fourth strap 68 and fifth strap 70 to the second and third straps 64, 66 are at approximately the opposite side of the loop formed by the second and third straps 64, 66 from where the second and third straps 64, 66 attach to the ends 76, 78 of the first strap 62. The fourth strap 68 and fifth strap 70 each have a free end 84, 86 adapted for attaching to an article of clothing worn at waist height, such at the belt, or the waistband of a skirt or a pair of trousers. The length of the fourth strap 68 and fifth strap 70 are adjustable for persons of various abdomen lengths.

The shoulder strap assembly 60 is worn by placing one of the second and third straps 64, 66 through the loop 24 of the receptacle 10. Next, the two ends 72, 74 of each strap 64, 66 are attached to form two separate closed loops 64, 66. Next, the wearer's arms are put through the loops 64, 66, much like putting on a vest, in such a way that the fourth strap 68 and fifth strap 70 hang down toward the waist. The fourth strap 68 and fifth strap 70 are then attached in the front of a waist height article of clothing of the wearer. The receptacle 10 for holding the cellular phone will rest just under the arm of the wearer, its positioned fastened with second fastener 28.

Figure 8:
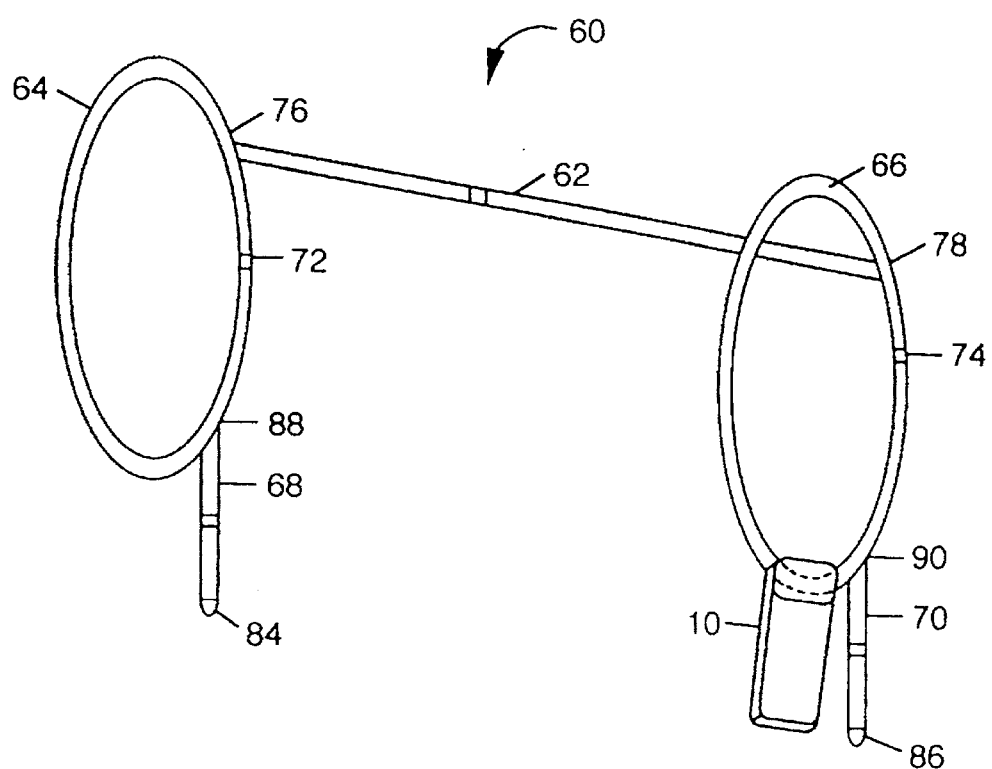
FIG. 8 is a pictorial diagram of a second embodiment of the shoulder strap assembly supporting the receptacle of FIG. 3.

Alternatively, FIG. 8 shows a second embodiment of the shoulder strap assembly 60. Here, the fourth strap 68 and fifth strap 70 attach to the second and third straps 64, 66 at positions 88, 90, approximately one third of the perimeter of the loop formed by the second and third straps 64, 66 from where the second and third straps 64, 66 attach to the ends 76, 78 of the first strap 62. In this embodiment, when the shoulder strap assembly 60 is worn, fourth strap 68 and fifth strap 70 hang toward the waist in the back of the wearer.

While the foregoing detailed description has described several embodiments of the cellular phone carrying device in accordance with this invention, it is to be understood that the above description is illustrative only and not limiting of the disclosed invention. The invention is both practical and fashionable and it will be appreciated that the same techniques can be utilized for a variety of styles. Thus the invention is to be limited only by the claims as set forth below.

What is claimed is:

1. A device for carrying an article, comprising:

a receptacle formed from a flexible material, the receptacle having a front panel, a back panel, two inner side panels, two outer side panels and a bottom panel;

the front panel, the back panel, the two inner side panels and the two outer side panels having upper edges defining a top opening for receiving the article into the receptacle;

the back panel having two vertically spaced horizontal slots for receiving a vertical strap for supporting the receptacle;

the back panel having a first means for removably and adjustably securing the receptacle in a desired position on the vertical strap supporting the receptacle;

a loop formed from the flexible material, the loop being attached to the back panel above the two vertically spaced horizontal slots for receiving a horizontal strap for supporting the receptacle;

the loop having a second means for removably and adjustably securing the receptacle in a desired position on the horizontal strap supporting the receptacle; and a side strap assembly for attaching to suspenders and supporting the receptacle, the side strap assembly having a horizontal first strap having a front end and a back end, the front end being adapted for attaching to a front of the suspenders at approximately mid-chest height and the back end being adapted for attaching to a back of the suspenders at approximately mid-chest height;

a second strap extending upwardly from the horizontal first strap at an inclined angle toward the front end of the horizontal first strap, the point of attachment of the second strap to the horizontal first strap being closer to the front end than to the back end of the horizontal first strap, the point of attachment defining a short side of the horizontal first strap, and a long side of the horizontal first strap, the second strap having a free end being adapted for attaching to the front of the suspenders at approximately shoulder height whereby the receptacle is attached to the side strap assembly by slipping the short side of the horizontal first strap through the loop of the receptacle and the ends of the horizontal first strap and the second strap are attached to the suspenders.

2. The device according to claim 1 further comprising:

the front panel having a left side and a right side, the two outer side panels extending outwardly from the left and right sides of the front panel;

the back panel having a left side and a right side, the two inner side panels extending outwardly from the left and right sides of the back panel;

each panel having an inner surface and an outer surface; and a third means for resealably and adjustably securing the two outer side panels over the two inner side panels for adjusting the width of the receptacle.

3. The device according to claim 2 wherein the third means is contact sensitive.

4. The device according to claim 3 wherein the third means is a hook material and a pile material which stick together when they are pressed against each other.

5. The device according to claim 1 wherein the receptacle further comprises a top cover panel formed from the flexible material, the top cover panel being of a size of the top opening, the top cover panel extending from the back panel for folding over and covering the top opening.

6. The device according to claim 5 wherein the top cover panel having a flap, the flap extending downwardly over the outer surface of the front panel when the top cover panel is covering the top opening and the inside surface of the flap having a fourth means for resealably and adjustably securing the flap to the outer surface of the front panel.

7. The device according to claim 6 wherein each panel and the flap being formed contiguously from a unitary piece of the flexible material.

8. The device according to claim 7 wherein the side strap assembly is reversible for wearing the receptacle on both right and left sides of a person.

9. The device according to claim 7 wherein each strap has a means for adjusting the length for accommodating body size of the wearer.

10. A device for carrying an article, comprising:

a receptacle formed from a flexible material, the receptacle having a front panel, a back panel, two inner side panels, two outer side panels and a bottom panel;

the front panel, the back panel, the two inner side panels and the two outer side panels having upper edges defining a top opening for receiving the article into the receptacle;

the back panel having two vertically spaced horizontal slots for receiving a vertical strap for supporting the receptacle;

the back panel having a first means for removably and adjustably securing the receptacle in a desired position on the vertical strap supporting the receptacle;

a loop formed from the flexible material, the loop being attached to the back panel above the two vertically spaced horizontal slots for receiving a horizontal strap for supporting the receptacle;

the loop having a second means for removably and adjustably securing the receptacle in a desired position on the horizontal strap supporting the receptacle; and a shoulder strap assembly for wearing the receptacle under an arm, the shoulder strap assembly having:

a horizontal first strap having a right end and a left end;

a second strap having a top end and a bottom end, the second strap being attached to the right end of the horizontal first strap, the second strap being adapted for attaching the top end and the bottom end to each other for forming a closed loop;

a third strap having a top end and a bottom end, the third strap being attached to the left end of the horizontal first strap, the third strap being adapted for attaching the top end and the bottom end to each other for forming a closed loop;

a fourth strap extending downwardly from the second strap, a free end of the fourth strap being adapted for attaching to an article of clothing worn at waist height; and a fifth strap extending downwardly from the third strap, a free end of the fifth strap being adapted for attaching to the article of clothing worn at waist height, such that the device is worn by placing one of the second and third straps through the loop of the receptacle, attaching the top and bottom ends of the second strap, attaching the top and bottom ends of the third strap, thereby forming two closed loops from the second and third straps, placing one arm through the closed loop of the second strap, placing another arm through the closed loop of the third strap, and attaching the free ends of the fourth and fifth straps to the article of clothing worn at waist height.

11. The device according to claim 10 wherein each strap has a means for adjusting the length for accommodating body size of the wearer.

12. The device according to claim 11 further comprising:

the front panel having a left side and a right side, the two outer side panels extending outwardly from the left and right sides of the front panel;

the back panel having a left side and a right side, the two inner side panels extending outwardly from the left and right sides of the back panel;

each panel having an inner surface and an outer surface; and a third means for resealably and adjustably securing the two outer side panels over the two inner side panels for adjusting the width of the receptacle.

13. The device according to claim 12 wherein the third means is contact sensitive.

14. The device according to claim 13 wherein the third means is a hook material and a pile material which stick together when they are pressed against each other.

15. The device according to claim 14 wherein the receptacle further comprises a top cover panel formed from the flexible material, the top cover panel being of a size of the top opening, the top cover panel extending from the back panel for folding over and covering the top opening.

16. The device according to claim 15 wherein the top cover panel having a flap, the flap extending downwardly over the outer surface of the front panel when the top cover panel is in a closed position and the inside surface of the flap having a fourth means for resealably and adjustably securing the flap to the outer surface.

17. The device according to claim 16 wherein each panel and the flap being formed contiguously from a unitary piece of the flexible material.

* * * * *